United States Patent
Chen

(10) Patent No.: US 6,520,048 B2
(45) Date of Patent: Feb. 18, 2003

(54) BICYCLE PEDAL ASSEMBLY PROVIDED WITH FRONT SIDE STOP ELEMENTS FOR PREVENTING LATERAL MOVEMENT OF A CLEAT

(76) Inventor: Chung-I Chen, No. 3, Kung-Chi Rd., Yu-Ssi-Kung-Yeh Dist., Ta-Chia Chen, Taichung Hsien (TW)

( * ) Notice: Subject to any disclaimer, the term of this patent is extended or adjusted under 35 U.S.C. 154(b) by 30 days.

(21) Appl. No.: 09/778,883

(22) Filed: Feb. 8, 2001

(65) Prior Publication Data

US 2002/0104403 A1 Aug. 8, 2002

(51) Int. Cl.[7] ............................................. B62M 3/08
(52) U.S. Cl. ................................. 74/594.6; 74/594.4
(58) Field of Search ............................. 74/594.4, 594.6

(56) References Cited

U.S. PATENT DOCUMENTS

| | | | | | |
|---|---|---|---|---|---|
| 5,423,233 A | * | 6/1995 | Peyre et al. | ............... | 74/594.6 |
| 5,557,985 A | * | 9/1996 | Nagano | ..................... | 74/594.4 |
| 5,692,415 A | * | 12/1997 | Lin | ............................ | 74/594.6 |
| 5,699,699 A | * | 12/1997 | Nagano | ..................... | 74/594.6 |
| 5,806,379 A | * | 9/1998 | Nagano | ..................... | 74/594.6 |
| 6,014,914 A | * | 1/2000 | Ueda | .......................... | 74/594.6 |
| 6,085,614 A | * | 7/2000 | Lin | ............................ | 74/594.6 |
| 6,128,973 A | * | 10/2000 | Nagano | ..................... | 74/594.6 |
| 6,151,989 A | * | 11/2000 | Ueda | .......................... | 74/594.6 |
| 6,196,084 B1 | * | 3/2001 | Ueda | .......................... | 74/594.6 |
| 6,446,529 B1 | * | 9/2002 | Tanaka | ....................... | 74/594.6 |

FOREIGN PATENT DOCUMENTS

GB          2202499    *   9/1988   ............ B62M/3/08

* cited by examiner

Primary Examiner—David A. Bucci
Assistant Examiner—Vicky A. Johnson
(74) Attorney, Agent, or Firm—Baker Botts L.L.P.

(57) ABSTRACT

A pedal assembly includes front and rear retaining members mounted on a pedal body. A spring unit biases the rear retaining member to confine a cleat between the front and rear retaining members. Each of the front and rear retaining members includes two downwardly extending side stop elements for limiting movement of an end engaging portion of the cleat therebetween.

1 Claim, 5 Drawing Sheets

BICYCLE PEDAL ASSEMBLY PROVIDED WITH FRONT SIDE STOP ELEMENTS FOR PREVENTING LATERAL MOVEMENT OF A CLEAT

BACKGROUND OF THE INVENTION

1. Field of the Invention

The invention relates to a pedal assembly, more particularly to a bicycle pedal assembly.

2. Description of the Related Art

A conventional bicycle pedal assembly is adapted to engage a cleat which has front and rear engaging portions and which is fixed to a bottom surface of a sole of a cyclist's shoe.

The conventional bicycle pedal assembly includes front and rear cleat retaining members mounted on a pedal body so as to confine the front and rear engaging portions of a cleat therebetween. The front cleat retaining member includes a front stop element, and two upwardly extending side stop elements which cooperates with the front stop element to prevent forward movement of the front engaging portion of the cleat. Thus, lateral disengagement of the front engaging portion of the cleat relative to the front retaining member is possible. In addition, the rear retaining member is provided with no side stop elements as such in case the bicycle turns swiftly to left or right from a straight path, the front and rear engaging portions of the cleat generally disengage from the front and rear retaining members. Thus, untimely disengagement of the cleat from the front and rear retaining members usually annoys the rider.

SUMMARY OF THE INVENTION

Therefore, the object of this invention is to provide a bicycle pedal assembly which includes front and rear retaining members that have front and rear stop elements for preventing forward and rearward movement of the cleat, and that are provided with side stop elements for preventing lateral movement of the cleat.

Accordingly, the bicycle pedal assembly of this invention includes front and rear retaining members mounted on a pedal body. A spring unit biases the rear retaining member to confine a cleat between the front and rear retaining members. Each of the front and rear retaining members includes two downwardly extending side stop elements for limiting movement of an end engaging portion of the cleat therebetween.

Thus, untimely removal of the cleat from the front and rear retaining members of the pedal body is prevented.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
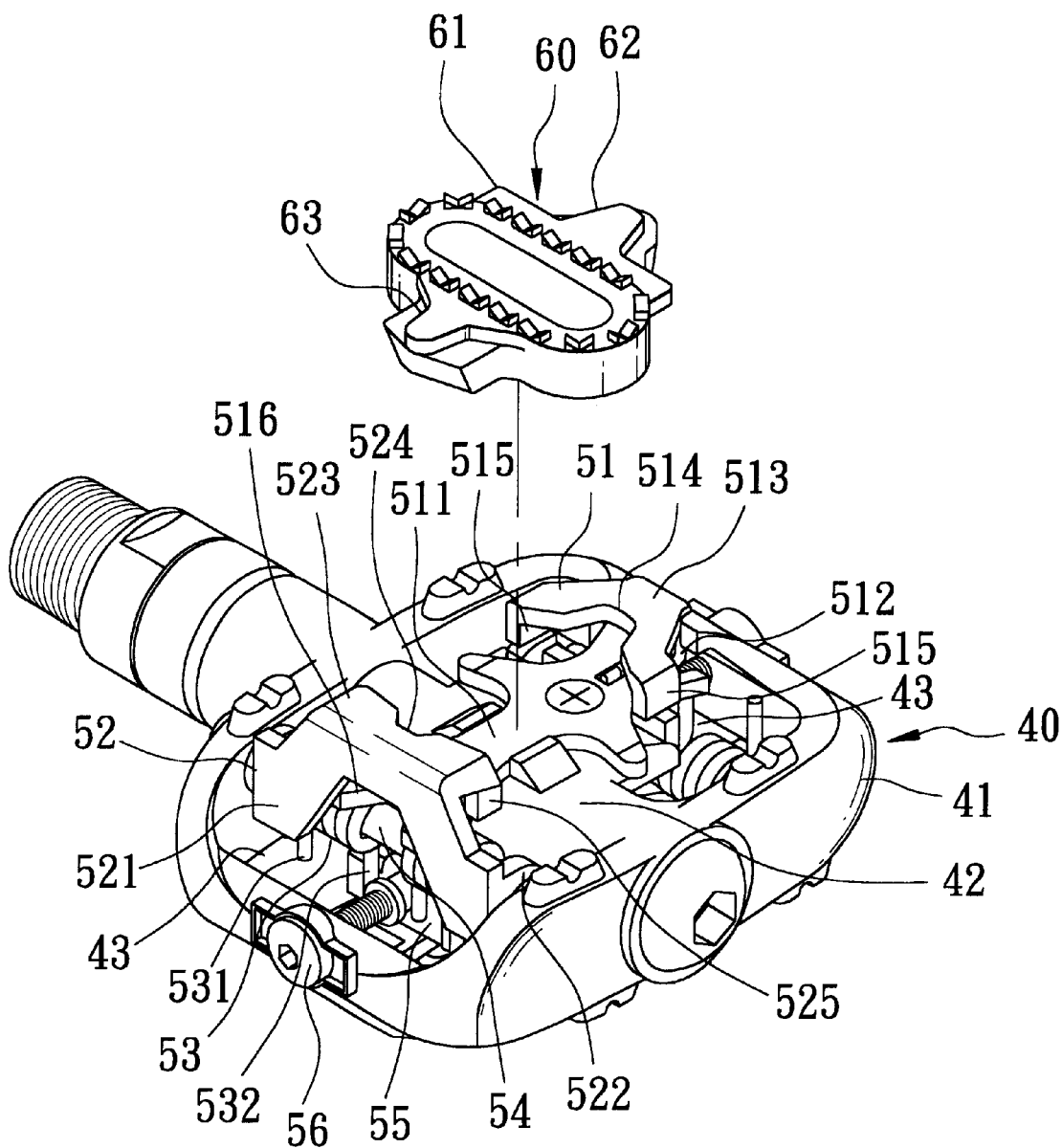
FIG. 1 is a perspective view of the preferred embodiment of a bicycle pedal assembly of this invention, wherein a cleat is removed from a pedal body in order to clarify configurations of front and rear retaining members.
Figure 2:
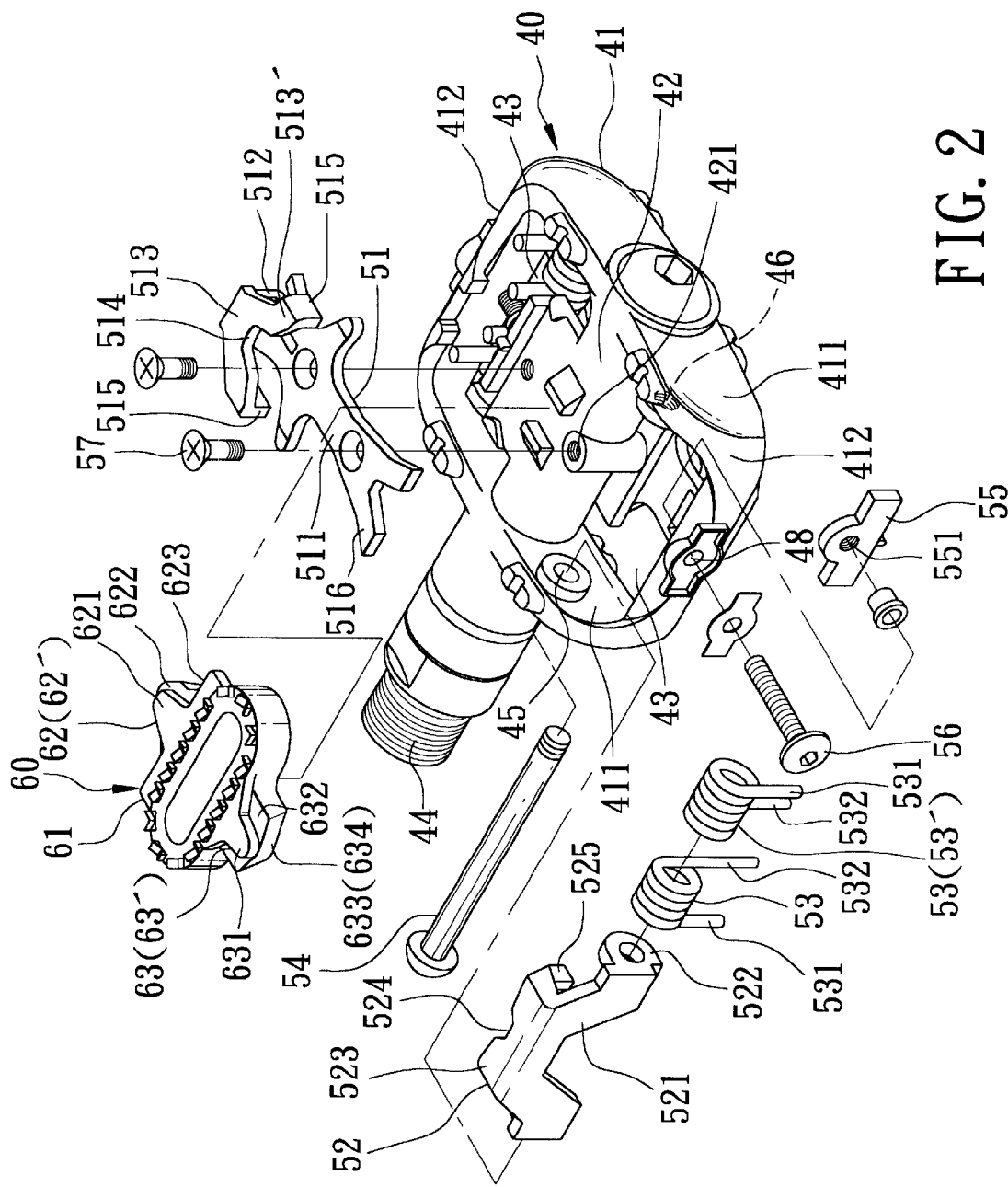
FIG. 2 is an exploded view of the preferred embodiment.

Referring to FIGS. 1, 2, 3 and 4, the preferred embodiment of a bicycle pedal assembly according to this inventions is shown to include a pedal shaft 44, a one-piece pedal body 40, two unitary front retaining members 51, two unitary rear retaining members 52, two pivot pins 54, two unitary cleats 60, and two spring units 53'. However, for better understanding of the present invention, only one assembly consisting of one cleat 60, one front retaining member 51, one rear retaining member 52, one pivot pin 54 and one spring unit 53' will be explained in the succeeding paragraphs as to mounting of the assembly on one side of the pedal body 40.

As illustrated, the pedal body 40 includes an annular frame 41, and a shaft tube 42 that is disposed rotatably on the pedal shaft 44, which in turn, is adapted to be mounted fixedly on a crank (not shown) of a driving sprocket of the bicycle. The shaft tube 42 is fixed on a middle portion of the frame 41 so as to define two chambers 43 that are formed in the frame 41 and that are located on two sides of the shaft tube 42.

The front retaining member 51 is mounted fixedly on the upper surface of the shaft tube 42 in the frame 41, and has a front end and a rear end.

The rear retaining member 52 is disposed within one of the chambers 43 in the frame 41.

The pivot pin 54 extends through a through hole 45 in one lateral side 411 of the frame 41 and engages a threaded hole 46 in the other lateral side 411 in the frame 41 for connecting the rear retaining member 52 rotatably to the pedal body 40.

The cleat 60 is disposed between the front and rear retaining members 51,52, and has a front end engaging portion 62' and a rear end engaging portion 63'. Since mounting of the cleat 60 to a bottom of a cyclist's shoe is not pertinent to the present invention, a detailed description of the same will be omitted herein for the sake of brevity.

The spring unit 53' is disposed in one of the chambers 43 of the frame 41 by the pivot pin 54, and biases the rear retaining member 52 to press against the cleat 60 for confining the cleat 60 between the front and rear retaining members 51,52.

The front retaining member 51 includes a mounting plate 511, a front stop element 512, a front retaining hook 513, and two first side stop elements 515. Two screws 57 extend through two mounting holes in the mounting plate 511, and engage two threaded holes 421 in the tube 42 in such a manner that the cleat 60 is disposed over the mounting plate 511. The front stop element 512 extends upward from a front end of the mounting plate 511 such that the cleat 60 is disposed behind the front stop element 512. The front retaining hook 513 extends rearward from an upper end of the front stop element 512, and has a rear end that is formed with a front retaining groove 514. The front end engaging portion 62' of the cleat 60 engages the front retaining groove 514 in the front retaining hook 513. The first side stop elements 515 extend respectively and downwardly from two opposite sides of the rear end of the retaining hook 513, and are located on two sides of the front retaining groove 14 such that the cleat 60 abuts against the first side stop elements 515 so as to be prevented from forward and lateral movements of the cleat 60 relative to the first side stop elements 515.

The rear retaining member 52 includes a rear stop element 521, a rear retaining hook 523, and two second side stop elements 525. The rear stop element 521 is disposed vertically behind the cleat 60. The rear retaining hook 523 extends forward from an upper end of the rear stop element (521), and has a front end that is formed with a rear retaining groove 524. The rear end engaging portion 63' of the cleat 60 engages the rear retaining groove 524 in the rear retaining hook 523. The second side stop elements 525 extend respectively and downwardly from two opposite sides of the front end of the rear retaining hook 523 such that the rear end engaging portion 63' of the cleat 60 is confined between the second side stop elements 525.

The front retaining hook 513 of the front retaining member 51 is generally V-shaped, and has two inclined arms 513' which define the front retaining groove 514 therebetween and which have interconnected front ends, and two spaced rear ends. In this preferred embodiment, the first side stop elements 515 extend respectively and downwardly from the spaced rear ends of the inclined arms 513'.

Figure 3:
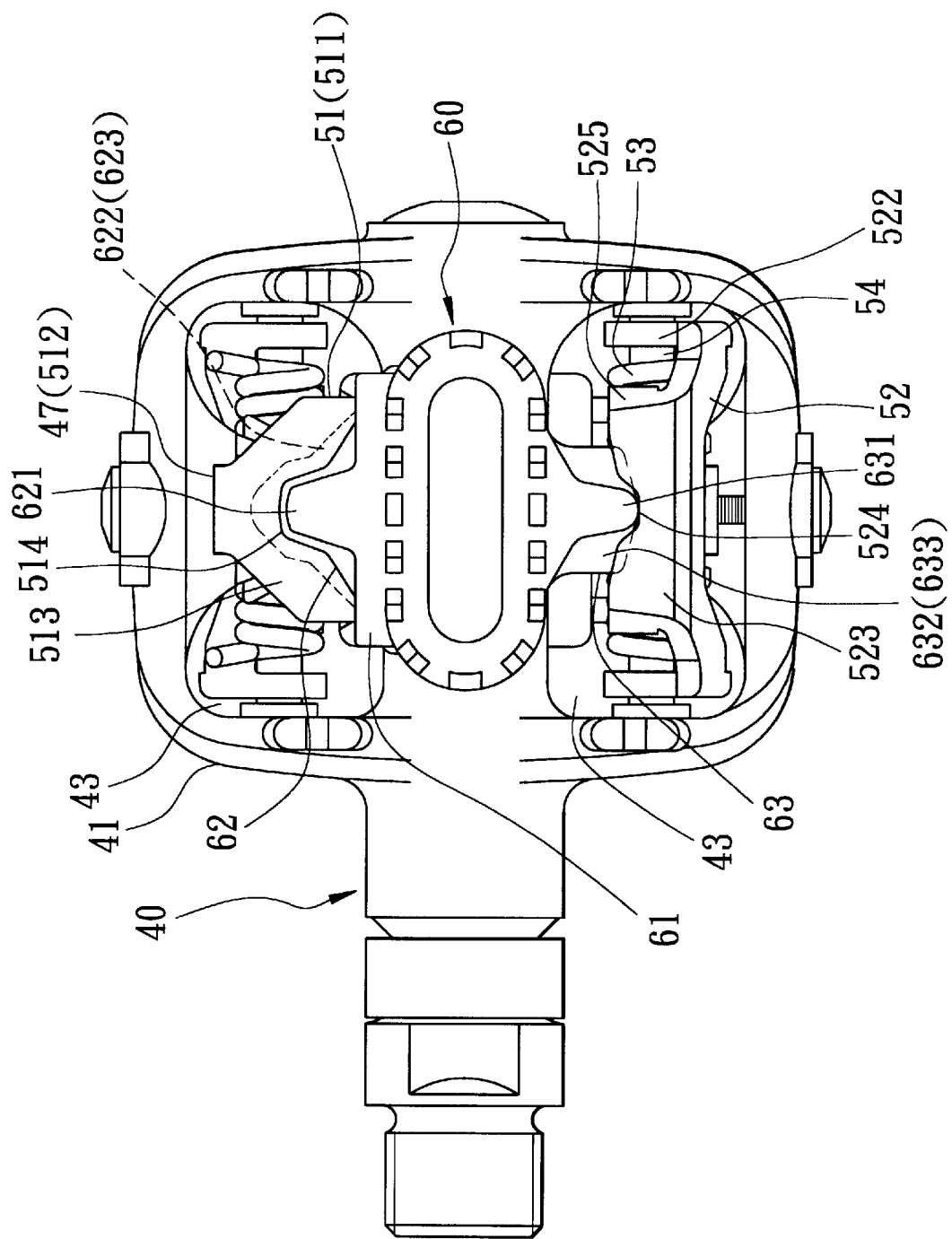
FIG. 3 is a top view of the preferred embodiment, illustrating how the cleat is confined between the front and rear retaining members.
Figure 4:
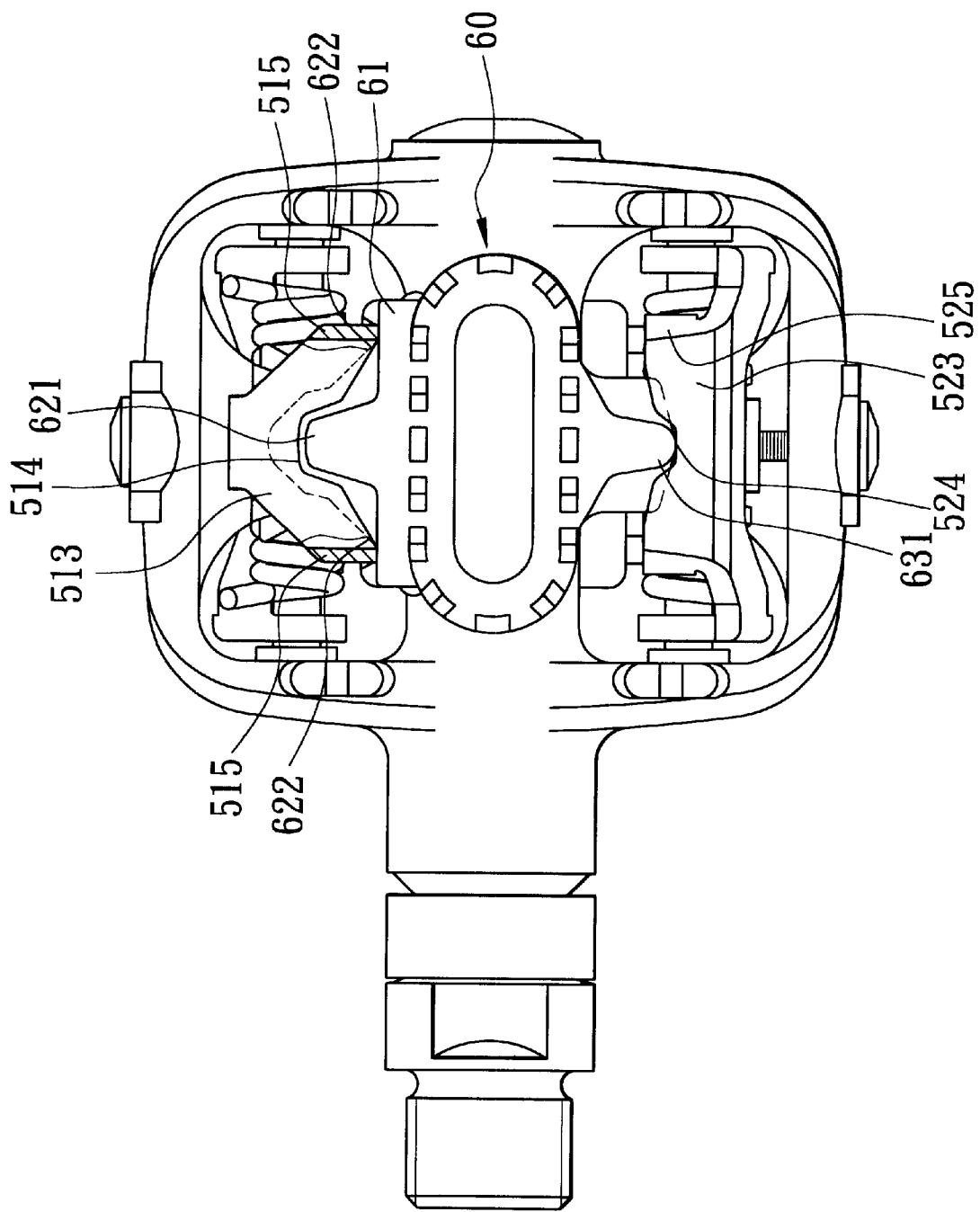
FIG. 4 is a partly sectional top view of the preferred embodiment, illustrating the position of two first side stop elements relative to the cleat.

The cleat 60 is generally cross-shaped, and has two side projections 61, a stepped front projection 62, and a stepped rear projection 63. Each of the front and rear projections 62,63 has a top portion 621,631, and a bottom portion 623,633 that is wider than the top portion 621,631 so as to form two shoulders 622,632 on two sides of the top portion 621,631. In this preferred embodiment, the top portion 621 of the front projection 62 constitutes the front end engaging portion 62' of the cleat 60 and while the top portion 631 of the rear projection 63 constitutes the rear end engaging portion 63' of the cleat 60. Under this condition, the bottom portion 623 of the front projection 62 is disposed between the front retaining hook 513 and the mounting plate 511 while the bottom portion 633 of the rear projection 63 is disposed between the rear retaining hook 523 and the mounting plate 511, as best shown in FIG. 3. The first side stop elements 515 of the front retaining member 51 abut against the side projection 61 and two opposite sides of the bottom portion 623 of the front projection 62 of the cleat 60, as best shown in FIG. 4. The bottom portion 633 of the rear projection 63 is confined between the second side stop elements 525. Thus, the cleat 60 is securely confined between the front and rear retaining members 51,52. Preferably, the bottom portion 633 of the rear projection 63 has a downwardly and forwardly inclined rear end surface 634 for facilitating movement of the rear projection 63 into a space between the rear retaining hook 523 and the mounting plate 511 of the rear retaining member 52.

The rear stop element 521 of the rear retaining member 52 has two opposite sides which are formed respectively with two aligned integral sleeves 522, through which the pivot pin 54 extends. The spring unit 53' includes two coiled torsion springs 53 which are sleeved around the pivot pins 54 and which are disposed between the sleeves 522. The frame 41 has a rear end portion 412 that is formed with a through hole 48 therethrough. Each of the torsion springs 53 has a first vertical end portion 531 that abuts against the rear stop element 521 in the rear retaining member 52, and a second vertical end portion 532. An adjustment bolt 56 extends through the through hole 48 in the frame 41 and engages a threaded hole 551 in a vertical movable push plate 55 which in turn abuts against the second vertical end portions 532 of the torsion springs 53 so that rotation of the adjustment bolt 56 on the frame 41 results in movement of the push plate 55relative to the torsion springs 53, thereby turning the second vertical end portions 532 of the torsion springs 53 relative to the first vertical end portions 531 and consequently varying magnitude of biasing force of the torsion springs 53 toward the rear retaining member 52. Note that two bifurcated rear ends 516 of the mounting plate 51 abut slidably the push plate 55 so as to prevent synchronous rotation the push plate 55 with the adjustment bolt 56.

Figure 5:
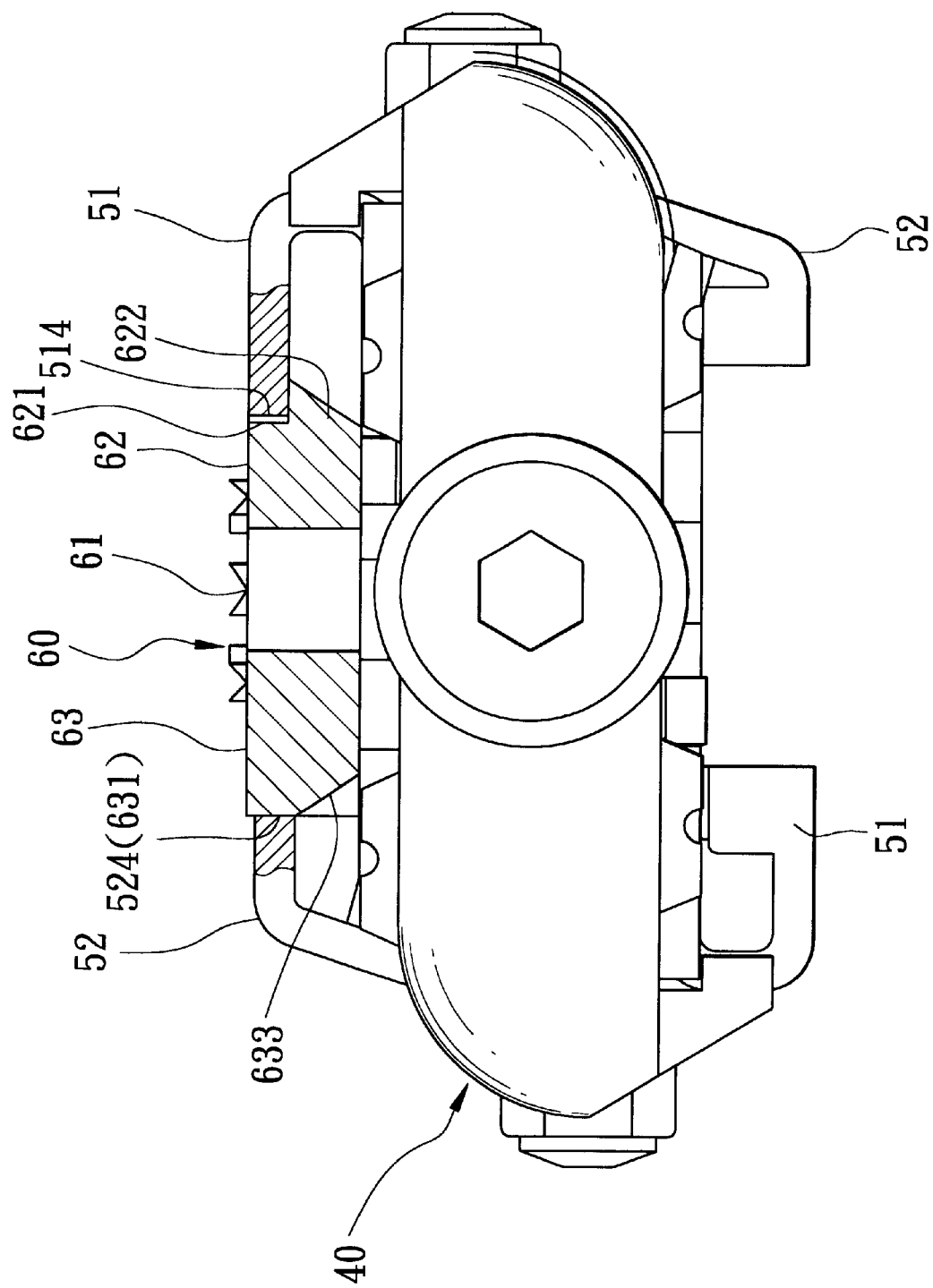
FIG. 5 is a partly sectional side view of the preferred embodiment, illustrating how the cleat is confined between the front and rear retaining members.

As best shown in FIG. 5, another assembly consisting of one front retaining member 51, one rear retaining member 52, one pivot pin 54 (see FIG. 2), and one spring unit 53' (see FIG. 2) is mounted on a bottom side of the pedal body 40 in the aforesaid manner.

When a cyclist desires to use the pedal assembly of the present invention, the cleat 60 can be attached to a bottom surface of the cyclist's shoe in a conventional manner. Then, the bottom portion 623 of the front projection 62 in the cleat 60 is inserted into the front retaining groove 514 of the front retaining hook 513. Under this condition, the downwardly and forwardly inclined rear end surface 634 of the rear projection 63 will be above the rear retaining groove 524 of the rear retaining hook 523. A downward pressure on the rear projection 63 results in placement of the bottom portion 633 of the rear projection 63 under the rear retaining hook 523 and between the second side stop elements 525.

With this invention thus explained, it is apparent that numerous modifications and variations can be made without departing from the scope and spirit of this invention. It is therefore intended that this invention be limited only as indicated in the appended claims.

I claim:
1. A bicycle pedal assembly including:
a pedal shaft;
a one-piece pedal body including an annular frame, a shaft tube that is disposed rotatably on said pedal shaft and that is fixed on a middle portion of said frame so as to define two chambers that are formed in said frame and that are located on two sides of said shaft tube;
a unitary front retaining member mounted fixedly on said shaft tube, and having a front end and a rear end;
a unitary rear retaining member disposed within one of said chambers;
a pivot pin disposed on said pedal body for connecting said rear retaining member rotatably to said pedal body;
a unitary cleat disposed between said front and rear retaining members; and
a spring unit for biasing said rear retaining member to press against said pedal body for confining said cleat between said front and rear retaining members;
wherein the improvement comprises:
said cleat having a front end engaging portion and a rear end engaging portion;
said front retaining member including
a mounting plate mounted fixedly on said tube, said cleat being disposed on and over said mounting plate,
a front stop element extending upward from said front end of said mounting plate, said cleat being disposed behind said front stop element,
a front retaining hook extending rearward from an upper end of said front stop element, and having a rear end that is formed with a front retaining groove, said front end engaging portion of said cleat engaging said front retaining groove in said front retaining hook
two first side stop elements extending respectively and downwardly from two opposite sides of said rear end of said front retaining hook and located on two sides of said front retaining groove, said cleat abutting against said first side stop elements so as to prevent forward and lateral movements of said cleat relative to said first side stop elements; said rear retaining member including
- a rear stop element disposed behind said cleat,
- a rear retaining hook extending forward from an upper end of said rear stop element, and having a front end that is formed with a rear retaining groove, said rear end engaging portion of said cleat engaging said rear retaining groove in said rear retaining hook, and two second side stop elements extending respectively and downwardly from two opposite sides of said front end of said rear retaining hook, said rear end engaging portion of said cleat being confined between said second side stop elements;

wherein said rear stop element has two opposite sides which are formed respectively with two aligned integral sleeves, through which said pivot pin extends, said spring unit including two coiled torsion springs which are sleeved on said pivot pins and which are disposed between said sleeves, said frame having a rear end portion that is formed with a threaded hole therethrough, each of said torsion springs having a first vertical end portion that abuts against said rear stop element, and a second vertical end portion said pedal assembly further including an adjustment bolt that extends threadably through said threaded hole in said frame, and a vertical movable push plate is formed with a threaded hole therethrough, through which said adjustment bolt extends, said second vertical end portions of said torsion springs abutting against said push plate so that rotation of said adjustment bolt on said frame results in movement of said push plate relative to said torsion springs, thereby turning said second vertical end portions of said torsion springs relative to said first vertical end portions and consequently varying magnitude of biasing force of said torsion springs toward said rear retaining member.

* * * * *